Nov. 29, 1932.  C. E. CARROLL  1,889,634
PELT OR FUR STRETCHER
Filed Feb. 5, 1932   2 Sheets-Sheet 1
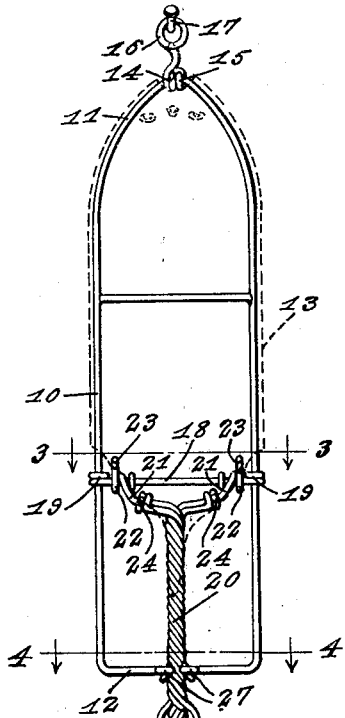
Fig. 1.
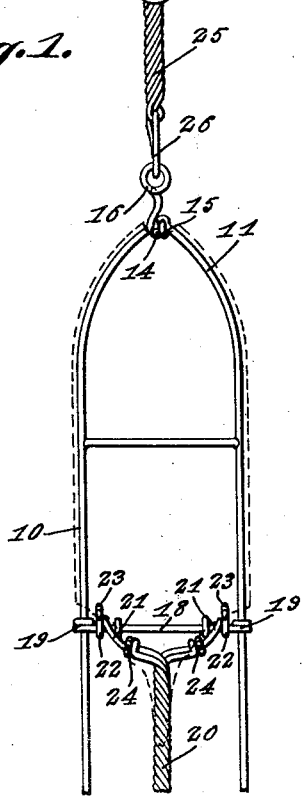
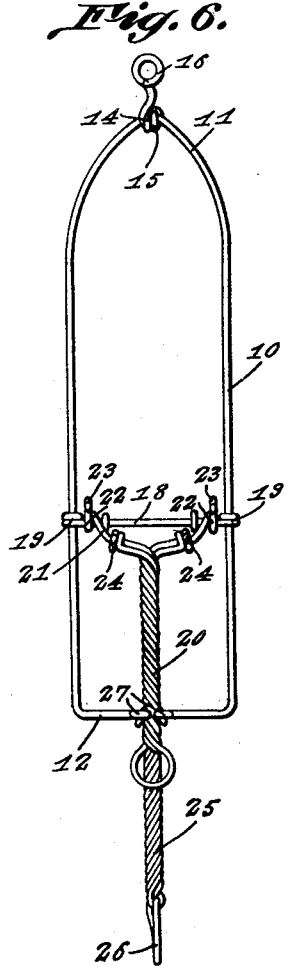
Fig. 6.
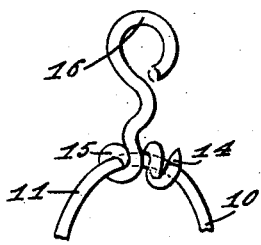
Fig. 5.
C. E. Carroll, INVENTOR
BY Victor J. Evans & Co.
ATTORNEY

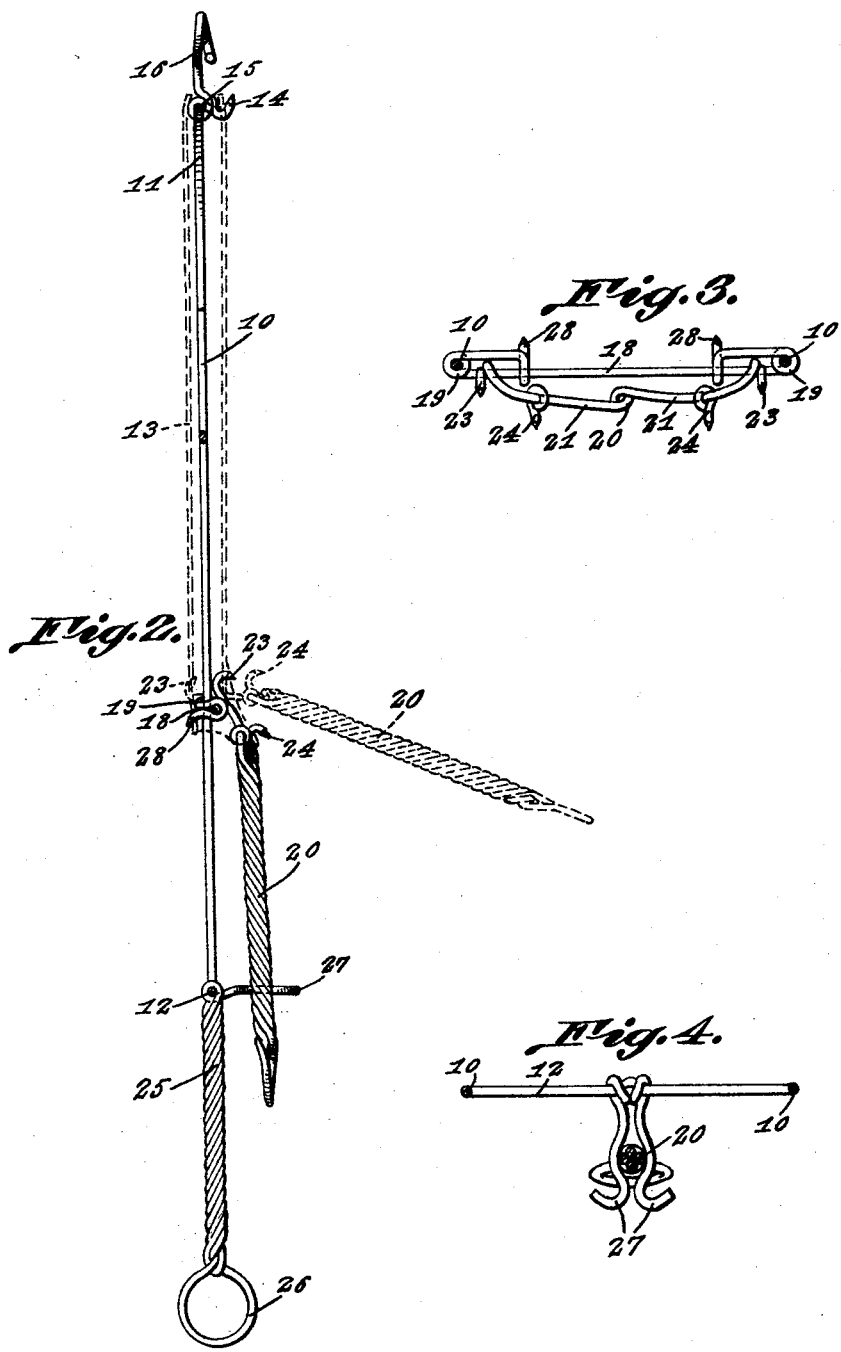

Patented Nov. 29, 1932

1,889,634

UNITED STATES PATENT OFFICE

CLARENCE E. CARROLL, OF GED, LOUISIANA

PELT OR FUR STRETCHER

Application filed February 5, 1932. Serial No. 591,190.

The invention relates to a stretcher and more especially to a pelt or fur stretcher.

The primary object of the invention is the provision of a stretcher of this character wherein the main frame thereof is of a kind to fit the skin or pelt of fur bearing animals so that the heads of such animals will be properly set and held, whereby the pelt or skin can be dried with rapidity as the major portion of the hide or skin is exposed for drying purposes, the stretcher in its entirety being of novel form.

Another object of the invention is the provision of a stretcher of this character, wherein the skin or hide of fur bearing animals can be conveniently and easily secured in place upon the stretcher so as to hold the skin or hide for the drying thereof and the same readily released without damage thereto, and the said skin or hide when upon the stretcher will be held taut and in a smooth stretched condition with the head of the animal properly centered.

A further object of the invention is the provision of a stretcher of this character which is extremely simple in construction, readily and easily operated, thoroughly reliable and efficient in its purpose, strong, durable, and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:—

Figure 1 is an elevation of several connected stretchers constructed in accordance with the invention, one of the stretchers being partly broken away.

Figure 2 is a vertical longitudinal sectional view through one of the stretchers.

Figure 3 is a sectional view on the line 3—3 of Figure 1 looking in the direction of the arrows.

Figure 4 is a sectional view on the line 4—4 of Figure 1 looking in the direction of the arrows.

Figure 5 is a detail perspective view of one of the securing hooks for the hide or skin of the animal.

Figure 6 is a view similar to Figure 1 showing but one of the stretchers with its parts in position as shown in Figure 1 of the drawings.

Similar reference characters indicate corresponding parts throughout the several views in the drawings.

Referring to the drawings in detail, the stretcher comprises an elongated open frame 10 preferably made from a single length of wire providing a bullet-shaped end 11 and an opposite abrupt straight end 12 and this frame 10 is adapted to accommodate the skin or hide of a fur bearing animal as indicated at 13 in Figures 1 and 2 of the drawings, the head portion of the skin or hide being properly centered and fitted upon the end 11 of said frame. This end 11 at its middle portion has hinged thereto a hook 14, its convolutions 15 embracing the frame 10 and at substantially right angles to this hook is a hanger eye 16 to permit the stretcher to be hung or suspended from a nail or other support 17. The hook 14 on the rocking thereof can be brought into or out of engagement with the skin or hide 13 and when in engagement therewith will fasten the latter to the frame 10.

Mounted upon the frame 10 is a slide 18 formed from a single length of wire disposed crosswise of said frame and bent to provide guide coils or loops 19 which loosely embrace the side members of the frame 10 and said slide is movable longitudinally of the frame to be positioned with respect to the tail or inner end of the hide or skin 13 when upon the frame 10.

Swingingly supported upon the slide 18 is a lever 20, the latter being preferably made from wire lengths and is bent at its inner portion to provide arms 21, these being swingingly connected to the slide 18 through hinging loops 22 and such arms 21 beyond the loops are formed with spaced pairs of hooks 23 and 24 respectively, these being adapted to be brought into engagement with the hide or skin 13 when upon the frame 10 to fasten the tail or inner end thereof and such hooks are releasably engaged with said skin or hide, the releasing of the same being effected by the swinging of the lever 20 from the full line position shown in Figure 2 to the dotted line position in said figure of the drawings.

The end 12 of the frame 10 centrally thereof is formed with a handle extension 25 terminating at its outer end in a ring 26 so that another stretcher of the kind as previously described can be coupled therewith, the eye 16 being of the open type for this purpose, that is to say, for engagement with the ring 26 on the bringing together of adjacent stretchers.

At the inner end of the handle 25 is formed a spring double arm clip or keeper 27 for receiving the lever 20 when swung to the position as shown in Figures 1, 2 and 6 of the drawings by full lines. The lever 20 when engaged with the clip or keeper 27 brings the hooks 23 and 24 of the arms 21 of said lever into engagement with the skin or hide 13 when upon the frame 10 for the fastening of said skin or hide in stretched condition thereon.

The ends of the slide 18 are bent upon themselves to provide hooks 28 for engagement with the skin or hide 13 to retain the same engaged upon the frame 10 when the said skin or hide is slipped or passed thereonto.

What is claimed is:—

1. A stretcher of the kind described comprising an elongated open frame having a bullet-shaped end and an opposite straight end, a hanger swingingly connected with the bullet-shaped end and having a hook, a slide movable on the frame and having hooks, a lever swingingly connected to the slide and having hooks, and a spring clip at the straight end of said frame and accommodating the lever.

2. A stretcher of the kind described comprising an elongated open frame having a bullet-shaped end and an opposite straight end, a hanger swingingly connected with the bullet-shaped end and having a hook, a slide movable on the frame and having hooks, a lever swingingly connected to the slide and having hooks, a spring clip at the straight end of said frame and accommodating the lever, a handle at the straight end of the frame, and a ring at the outer end of said handle.

In testimony whereof I affix my signature.

CLARENCE E. CARROLL.